Jan. 21, 1969  H. E. CIER  3,423,368

EXTRACTIVE RECOVERY OF FORMALDEHYDE

Filed Oct. 14, 1965

INVENTOR.
HARRY E. CIER,
BY
*Sylvester H. Brock Jr.*
ATTORNEY

United States Patent Office 3,423,368
Patented Jan. 21, 1969

3,423,368
EXTRACTIVE RECOVERY OF FORMALDEHYDE
Harry E. Cier, Elizabeth, N.J.
(425 Park Ave., Linden, N.J. 07036)
Filed Oct. 14, 1965, Ser. No. 495,961
U.S. Cl. 260—67      4 Claims
Int. Cl. C08g 7/00; C07c 47/02

ABSTRACT OF THE DISCLOSURE

Formaldehyde is recovered from an aqueous stream, separated from the vaporous reaction product of $H_2SO_4$ catalyzed condensation of an aromatic hydrocarbon with formaldehyde to obtain a resin, by solvent extraction of the aqueous stream with an oil product stream, fractionated from the crude resin product stream, under specified conditions.

---

Figure 1:
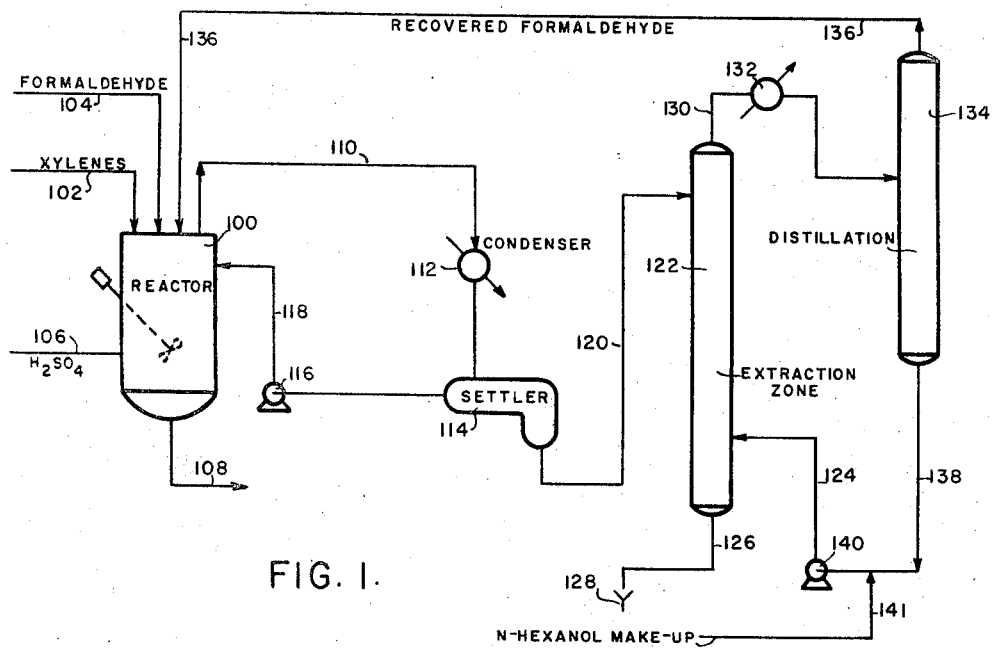

The present invention relates to the recovery of formaldehyde from a formaldehyde-containing aqueous stream. More particularly, the present invention relates to the recovery of formaldehyde from an aqueous stream by extracting the aqueous stream with a liquid alcohol having more than four carbon atoms, separating the formaldehyde-containing alcohol from the aqueous stream, and distilling the alcohol to recover the formaldehyde. In its most specific aspects, the present invention relates to the extraction of the formaldehyde with alcohol at a temperature below the alcohol-formaldehyde dissociation temperature, and distilling the alcoholic extract to recover formaldehyde at a temperature above the alcohol-formaldehyde dissociation temperature.

The recovery of formaldehyde from an aqueous solution is extremely difficult. This difficulty arises from the fact that hydrates of formaldehyde are formed both of monomeric formaldehyde (which forms methylene glycol) and of polymeric formaldehyde [which forms $(CH_2O)_nH_2O$]. Therefore, the distillation of aqueous formaldehyde has proceeded more as an art than as a science. In order to recover formaldehyde from the aqueous solution, it has been necessary to take advantage of the vapor enrichment obtained by repeatedly partially condensing the vaporized solution, which is accomplished only with difficulty.

It has been found, however, that the formaldehyde can be separated from an alcohol solution wherein the formaldehyde appears as a hemiformal rather than as a hydrate. By extracting the formaldehyde from the aqueous stream by contact with the stream of a suitable alcohol, the alcohol will remove virtually all of the formaldehyde from the aqueous stream (which can then be discarded) and the formaldehyde can be easily separated from the alcohol by distillation at a temperature above the alcohol-formaldehyde dissociation temperature. As used in this application, the terms "dissociation temperature" and "alcohol-formaldehyde dissociation temperature" mean that temperature at which about 90% of the hemiformal is dissociated into formaldehyde and alcohol.

The alcohol to be used in the extraction of formaldehyde is chosen to have two basic characteristics. First, the alcohol must be substantially insoluble in the aqueous stream in order that the extraction can proceed without an undue loss of alcohol in the water stream which is removed and discarded. Secondly, the boiling point of the alcohol must be suitable for extraction at a temperature below the dissociation temperature and for distillation above the dissociation temperature. It is to be recognized that the temperature of extraction can be widely varied, on the low temperature side, and that the distillation temperature under reflux conditions can be varied somewhat by changing the pressure of the system. It has been found that suitable alcohols for use in the present invention are normal- and iso-aliphatic alcohols having from 5 to 10 carbon atoms. Alcohols of 6 to 10 carbon atoms are preferred since they are essentially insoluble in water. Normal butanol, although it can be used in the system, is relatively soluble in the aqueous stream, and undue losses of alcohol would be suffered in the aqueous discard stream being removed from the extraction zone.

The normal-/iso-aliphatic alcohols exhibit a decreasing solubility in water with increasing molecular weight, along with a decreasing tendency to form azeotropic mixtures with water. These characteristics are illustration in Table I below, using normal $C_1$ to $C_8$ alcohols as examples. With n-hexyl, n-heptyl, and n-octyl alcohols, the extent of azeotroping is not too severe. Alcohols boiling higher than n-octyl alcohol will not form azeotropes with the aqueous formaldehyde stream.

TABLE I.—CHARACTERISTICS OF n-ALIPHATIC ALCOHOLS

| n-Alcohol | Boiling Point, °C. | Solubility in 100 parts (wt.) $H_2O$ | Azeotrope formed with $H_2O$ |
|---|---|---|---|
| Methyl | 64.7 | ∞ | No. |
| Ethyl | 78.4 | ∞ | Yes. |
| Propyl | 97.2 | ∞ | Yes. |
| Butyl | 118.0 | 9.0 | Yes. |
| Amyl | 138.5 | 2.7 | Yes. |
| Hexyl | 157.5 | 0.6 | Yes. |
| Heptyl | 175.0 | 0.18 | Yes. |
| Octyl | 194.5 | 0.05 | Barely. |

In general, alcohols boiling within the range of 125° C. to 250° C. can be employed.

Indicative of the extractive efficiency of normal $C_4$ to $C_8$ alcohols are the following single-stage extraction equilibrium data showing the composition of raffinates and extracts obtained by contacting aqueous formaldehyde with various alcohols.

TABLE II

| n-Alcohol | Raffinate, Mol Percent | | | Extract, Mol Percent | | |
|---|---|---|---|---|---|---|
| | $CH_2O$ | $H_2O$ | ROH | $CH_2O$ | $H_2O$ | ROH |
| Butyl | 5.4 | 92.2 | 2.4 | 20.2 | 52.3 | 27.7 |
| Amyl | 5.8 | 93.6 | 0.6 | 27.1 | 35.6 | 37.3 |
| Hexyl | 6.7 | 93.2 | 0.1 | 31.4 | 38.6 | 40.0 |
| Octyl | 7.6 | 92.4 | | 34.0 | 29.0 | 37.0 |

As can be seen from Table II, as the molecular weight of the extracting alcohol increases, the formaldehyde/water ratio in the extract also increases. In n-hexyl and n-octyl alcohol extraction, the alcohol-free formaldehyde concentration is higher than 50%. The comparison is valid, however, in illustrating the relative efficiencies of the alcohols as extraction solvents.

The alcohol-formaldehyde dissociation temperature is determinable for each of the alcohols to be used. These temperatures are inductive of the breakdown of the hemiformal into the alcohol and monomeric or polymeric formaldehyde, as the case may be. This can be represented by the equation:

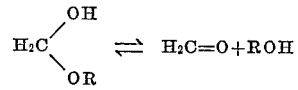

where R is derived from the alcohol. For n-hexanol, the dissociation temperature appears to be about 87.5° C., as is seen from Table III.

TABLE III.—DISSOCIATION OF n-HEXANOL-FORMALDEHYDE

| Temp., °C.: | Percent dissociation |
|---|---|
| 87.5 | 90.5 |
| 93.0 | 95.5 |
| 103 | 97.5 |
| 126 | 100 |

Since the boiling point of n-hexanol is about 157.5° C., the present invention can be carried out using n-hexanol in the extraction at a temperature of about 25° C. to 50° C. The distillation can be at a temperature of about 100° C. to 158° C. under pressure conditions chosen to reflux the alcohol (i.e., from 100 to 760 mm. Hg). Thus, n-hexanol is a suitable and easily available alcohol for use in the present process. Isooctyl alcohol can be used in the same manner as n-hexanol, with an extraction temperature of 25° C. and a distillation temperature of 100° C. to 150° C. at 100 to 760 mm. Hg pressure.

In general, the preferred mode of carrying out the present process can be stated to comprise a process of contacting an aqueous stream which contains from 10 to 50 weight percent formaldehyde with a $C_6$ to $C_{10}$ normal or isoaliphatic alcohol, at a temperature of 15° C. to 75° C., which is below the alcohol formaldehyde dissociation temperature, and at an alcohol-to-formaldehyde mol ratio of from 1 to 3, whereby at least a portion of said formaldehyde is extracted into said alcohol. The formaldehyde-containing alcohol is separated from the aqueous stream and is distilled at a temperature of 100° C. to refluxing temperature (e.g., to 250° C.), which is above the alcohol-formaldehyde dissociation temperature, preferably under refluxing conditions at a pressure of 100 to 760 mm. Hg, whereby the formaldehyde is separated as a substantially pure vaporous product. Instead of refluxing the alcohol, an inert sweep gas, such as nitrogen or $CO_2$, can be used. The alcohol which remains may contain a small amount of formaldehyde, but can be recycled into the extraction zone so that the amount of formaldehyde contained in the alcohol is not deleterious.

Figure 2:
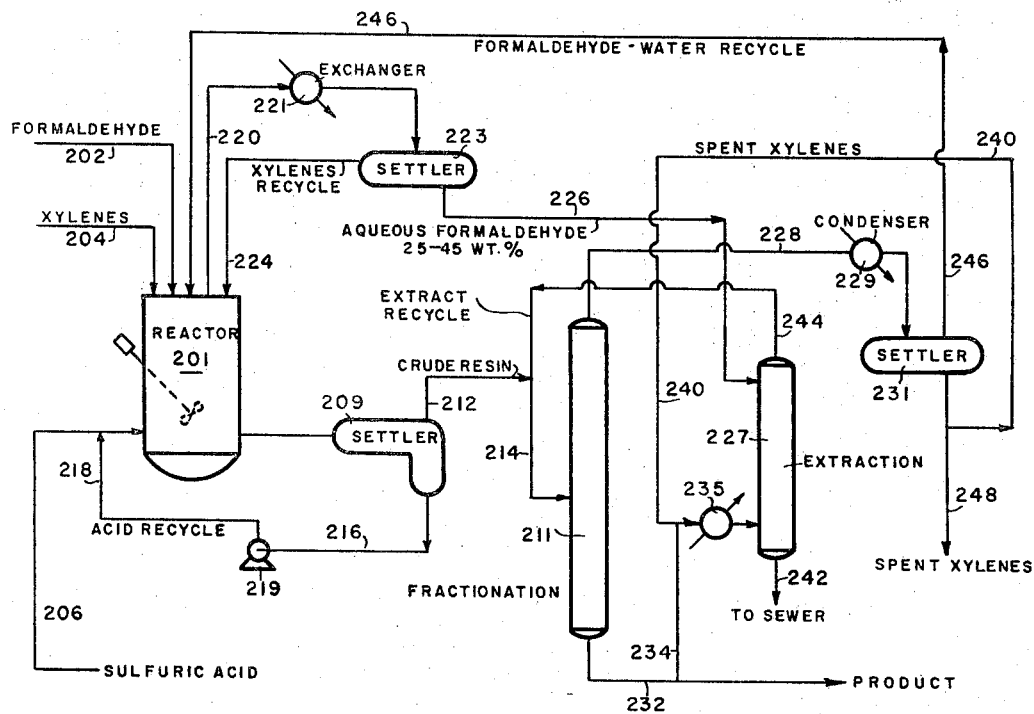

The present invention is illustrated in the drawings, wherein:

FIG. 1 is a schematic flow sheet showing the use of an extrinsically supplied alcohol; and FIG. 2 is a schematic flow sheet showing the use of the alcoholic condensation product for removing formaldehyde from the aqueous stream.

Referring now to FIG. 1, a preferred mode of practicing the present invention is set forth. In the drawing, the aqueous, formaldehyde-containing stream is obtained from a process of condensing an aromatic hydrocarbon (such as xylene) and formaldehyde to form a resin. Thus, into a reaction zone 100 are admitted xylenes by way of line 102, and formaldehyde by way of line 104. The reaction zone contains sulfuric acid as a catalyst which may be introduced by way of line 106. In the course of the reaction, a liquid product is removed from the reaction zone by way of line 108, and is treated to recover a hydrocarbon product and to recycle acid to the reaction zone, all of which forms no part of the present invention. The conditions in the reaction zone 100 are, however, such that a vaporous overhead stream is withdrawn by way of line 110 and passed through a condenser 112 to form a liquid product which is then discharged into a settler 114. In the settler 114, a hydrocarbon supernatant phase is formed which is recycled by way of the pump 116 and line 118 into the reaction zone 100. An aqueous lower phase is removed from the settler 114 by way of line 120. This aqueous phase may contain from 15 to 45 weight percent formaldehyde dissolved therein. This formaldehyde-containing aqueous stream, at a temperature of about 25° C., is passed by way of line 120 into an extraction zone 122, which may suitably be a packed column, a bubble cap column, or other liquid-liquid contacting device known to those skilled in the art. In the preferred mode, the aqueous stream is admitted near the top of the column and percolated downwardly in countercurrent contact with a normal hexanol stream which is introduced at a temperature of about 25° C. by way of line 124. The alcohol-formaldehyde mol ratio is about 1.5. The substantially formaldehyde-free, aqueous stream is discharged from the bottom of the tower by way of line 126 and may be discarded through a sewer 128. The formaldehyde content of the discarded stream is a function of the number of extraction stages, the amount of alcohol used, etc. Formaldehyde concentrations in this discard stream will normally be below 5% by weight.

The normal hexanol is passed upwardly through the column 122, extracts the formaldehyde from the aqueous stream, and is removed by way of line 130 and passed through a heater 132 into a distillation tower 134, wherein the temperature of distillation is maintained above the dissociation temperature. The recovered formaldehyde is passed as a vaporous stream through line 136 and recycled into the reaction zone or otherwise used as desired. The alcohol is recycled by way of line 138 and pump 140 for use in the extraction zone 122. Normal hexanol makeup can be introduced into the system by way of line 141 if desired.

Example 1

To illustrate the use of a normal alkanol in the extraction of aqueous formaldehyde streams, 25 grams of aqueous formaldehyde (containing 7.35 grams of $CH_2O$) was admixed with 25 grams of n-amyl alcohol and stirred at atmospheric pressure and ambient temperature for 15 minutes, settled, and the two phases analyzed for formaldehyde. Raffinate (18.3 grams) contained 22.85 weight percent $CH_2O$ (4.189), a reduction of 43% in the formaldehyde originally present.

Three successive extractions with n-amyl alcohol reduced the aqueous formaldehyde concentration by about 75%.

Thus, it is seen that a suitable system for recovering formaldehyde is provided by the present invention.

In an alternative mode, as shown in FIG. 2, the oil, product of the aromatics-formaldehyde condensation is used as the extracting alcohol. During the condensation reaction an alcoholic product is formed by the addition of a formaldehyde molecule to an aromatic nucleus:

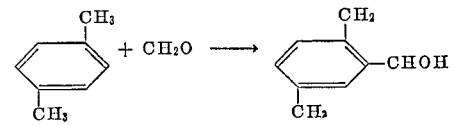

The alcohol group can appear also in the polymeric products of the condensation reaction, e.g.:

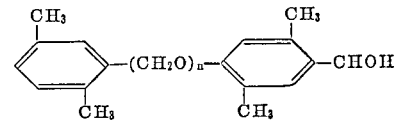

From laboratory inspection of the products of the condensation reaction, the high-boiling (600° F.+) portion of the oil product has been found to contain hydroxyl substituents on from 50 to 80% of the polymeric molecules. Thus, when using the oil product as an extraction solvent, the same general conversion of formaldehyde into hemiacetals is involved, along with a small amount of physical solubility of formaldehyde in the oil product.

Referring to FIG 2, the alternative mode of recovering formaldehyde is clearly shown. The condensation reaction is carried out in reactor 201, with feedstocks being introduced by formaldehyde line 202, xylenes line 204, and acid makeup line 206. In the reactor 201, exemplary reaction conditions include a temperature of about 203° F., a pressure of about 5.7 p.s.i.g., a xylene charge rate of 7.8 lb./hr., formaldehyde charge rate of 3.3 lb./hr. (containing 91 wt. percent paraformaldehyde, 9% water), acid concentration about 42.0 wt. percent (aqueous sulfuric acid), residence time about 2 hours, acid-oil volume ratio about 2.0, and a formaldehyde-oil mol ratio of about 1.5. Under these conditions about 9.3 lb./hr. of oil product is obtained, which is removed by way of line 208 in admixture with acid catalyst, separated in settler 209 from the acid, and charged (as a crude resin stream) to fractionator 211 via lines 212 and 214. Acid is recycled via lines 216 and 218 by pump 219.

An overhead vaporous product is withdrawn by way of line 220, condensed in exchanger 221, and discharged via line 222 into settler 223. In settler 223 a supernatent oil layer is formed which is returned to the reactor by line 224. A lower, aqueous layer (containing from 25 to 45 wt. percent of dissolved formaldehyde) is withdrawn by line 226 and conveyed to extraction zone 227 for treatment in accordance with the present invention.

The crude resin is fractionated in fractionator 211 to produce an overhead stream (containing water, formaldehyde, and unreacted xylenes) which is passed by line 228 and condenser 229 into settler 231. A major proportion of the overhead stream results from a combination of the extract from zone 227 with the crude resin before fractionation thereof, as will be seen hereinafter. An oil product stream is withdrawn via line 232 from the bottom of fractionator 211.

The extraction zone 227 is a suitably designed liquid-liquid extraction apparatus wherein the aqueous formaldehyde stream is countercurrently contacted with a portion of the oil product stream which is passed, via line 234 and exchanger 235, into zone 227, preferably near the bottom thereof. Extraction is accomplished at an oil-aqueous stream volume ratio from 1 to 5 (preferably 3), a temperature of 35° C. to 85° C. (preferably 60° C.), at atmospheric pressure, and an aqueous stream residence time of up to 4 hours. The actual contact time will vary with the efficiency of the extraction apparatus, the amount of spent xylenes (discussed in the following paragraph) which may be recycled to aid in phase separation, etc.

In order to assist in the settling of the extract and to prevent formation of an intractable mixture in the extraction zone 227, it may some times be desirable to recycle a portion of the spent xylenes via line 240 and to combine the spent xylenes with the oil product before introduction into the bottom of zone 227. The ratio of spent xylenes-to-oil product can range from 0 to 2 vol./vol. When spent xylenes are recycled, they are not included with the oil product in determining the oil-aqueous stream volume ratio.

A scrubbed water stream is discharged from the extraction zone by way of line 242 and may be sewered. The extract is withdrawn by way of line 244 and combined with crude resin from settler 209, and is charged therewith into fractionator 211 for separation of formaldehyde, water, and xylenes from the oil product. As hereinabove stated, the overhead from fractionator 211 is separated in settler 231. Aqueous formaldehyde (having a concentration greater than 50 wt. percent) is recycled to the reactor via line 246. Spent xylenes are removed from the system via line 248.

By using the oil product as the source of hydroxyl groups, the presence of a foreign substance is avoided so that incorporation of an alkanol in the product does not occur. Also, the expense of a separate recovery system for the alkanol is avoided.

As exemplary of the alternative mode of extracting formaldehyde, the following data are presented.

Examples 2 and 3

An oil product obtained by condensation of xylenes and formaldehyde was used as the extraction alcohol. This oil product contained about 14% $O_2$ and had hydroxyl substituents on from 70 to 75% of the molecules. The oil product and an aqueous formaldehyde solution were admixed in a beaker, stirred, and settled, and the formaldehyde content of the resultant oil and aqueous layers was determined. These examples are compared below in Table IV.

TABLE IV

| | Example 2 | Example 3 |
|---|---|---|
| Extraction temp., °F | 110–120 | 150 |
| Charge, aqueous formaldehyde, grams | 110.8 | 111.7 |
| $CH_2O$ in charge, grams | 44.2 | 44.5 |
| Oil product, grams | 314.1 | 316.8 |
| Stirring time, hours | 2 | 2 |
| Settling time | (1) | (1) |
| Recovered aqueous layer, grams | 80.7 | 80.3 |
| $CH_2O$ content of aqueous layer, grams | 13.7 | 12.8 |
| $CH_2O$ disappearance, grams | 30.5 | 31.7 |
| Percent $CH_2O$ removed | 69.0 | 71.0 |

1 Overnight.

Three hundred grams of xylenes were added to the mixture after stirring to aid in settling.

From the data of Table IV it can be seen that a high percentage of the formaldehyde was removed in the single-stage extraction.

Having disclosed the invention, and a preferred mode of carrying out the process of the invention, what is desired to be protected by Letters Patent should be limited not by the specific examples herein, but rather only by the appended claims.

I claim:

1. In the sulfuric acid catalyzed condensation of an aromatic hydrocarbon with formaldehyde to obtain a resin wherein a vapor phase reaction product is condensed and separated into an aromatic hydrocarbon recycle stream and an aqueous formaldehyde stream, and wherein a liquid phase reaction product is separated into a sulfuric acid recycle stream and a crude resin product stream, a method of recovering formaldehyde from said aqueous formaldehyde stream which comprises
    fractionating said crude resin product stream to obtain an oil product stream and an overhead stream,
    said overhead stream comprising spent aromatic hydrocarbon, water, and formaldehyde,
    contacting said aqueous formaldehyde stream with said oil product stream under extraction conditions including.
        an extraction oil-aqueous stream volume ratio from 1 to 5,
        a temperature from 35° C. to 85° C., and at atmospheric pressure,
    whereby an extract stream and a scrubbed aqueous stream are obtained.

2. A method in accordance with claim 1 further comprising the step of combining the extract stream with said crude resin product before fractionation.

3. A method in accordance with claim 2 wherein conditions in the extraction zone include
    an aromatic hydrocarbon-oil product volume ratio of about 1,
    an extraction oil-aqueous stream volume ratio of about 3, and
    a temperature of about 65° C.

4. A method in accordance with claim 2 in which the aromatic hydrocarbon is xylene.

References Cited

UNITED STATES PATENTS 3,000,859 9/1961 Mirviss et al. _____ 260—67
3,178,393 4/1965 Brandt et al. _____ 260—67

WILLIAM H. SHORT, *Primary Examiner.*

L. M. PHYNES, *Assistant Examiner.*

U.S. Cl. X.R.
260—606

UNITED STATES PATENT OFFICE
CERTIFICATE OF CORRECTION

Patent No. 3,423,368                                January 21, 1969

Harry E. Cier

It is certified that error appears in the above identified patent and that said Letters Patent are hereby corrected as shown below:

In the heading to the printed specification, lines 3 and 4, "Harry E. Cier, Elizabeth, N. J. (425 Park Ave., Linden, N. J. 07036)" should read -- Harry E. Cier, Elizabeth, N. J., assignor to Esso Research and Engineering Company --.

Signed and sealed this 2nd day of June 1970.

(SEAL)
Attest:

Edward M. Fletcher, Jr.                        WILLIAM E. SCHUYLER, JR.
Attesting Officer                                   Commissioner of Patents